(12) United States Patent
Kim

(10) Patent No.: US 6,442,801 B1
(45) Date of Patent: Sep. 3, 2002

(54) VEHICLE HOOD HINGE

(75) Inventor: Ho Kim, Gunpo-shi (KR)

(73) Assignee: Kia Motors Corporation (KR)

( * ) Notice: Subject to any disclaimer, the term of this patent is extended or adjusted under 35 U.S.C. 154(b) by 84 days.

(21) Appl. No.: 09/732,906

(22) Filed: Dec. 8, 2000

(30) Foreign Application Priority Data

Oct. 19, 2000 (KR) .......................................... 2000-61697

(51) Int. Cl.$^7$ .............................................. E05D 15/06
(52) U.S. Cl. .......................... 16/361; 16/366; 180/69.2; 180/274
(58) Field of Search .......................... 16/361, 357, 365, 16/289; 180/69.2, 69.21, 274; 296/189

*Primary Examiner*—Anthony Knight
*Assistant Examiner*—Michael Wayne White
(74) *Attorney, Agent, or Firm*—Christie, Parker & Hale, LLP

(57) ABSTRACT

A vehicle hood hinge includes a hinge arm contacted with a bottom surface of hood at its top surface and provided with a fitting hole and first and second hinge holes, the fitting hole being fitted into the bottom surface of the hood by a bolt, and the first and second hinge holes being formed at front and rear portions of one side of the hinge arm; first and second links being respectively fitted into the first and second hinge holes by a shaft pin at their top portions; a hinge support provided with a hinge hole at one side portion and securing holes at front and rear portions, the hinge hole being rotatably fitted to a bottom portion of the second link by the shaft pin, and the securing holes being fitted into a top surface of the vehicle at its bottom surface by a bolt; a slot longitudinally pierced in a lengthwise direction to detach the hinge pin fitted into the bottom portion of the first link from a center shaft of the hinge during an external impact; and a hinge positioning means formed in the slot to prevent the hinge pin from being detached from a normal hinge operation position. When a hood is in contact with a body of a walker due to a head-on collision accident between a vehicle and the walker during driving of the vehicle, the hood moves downwardly to absorb impact energy as a bottom end of the first link moves along a slot, thereby reducing injury of the walker.

5 Claims, 5 Drawing Sheets

VEHICLE HOOD HINGE

CROSS REFERENCE TO RELATED APPLICATION

This application claims priority of Korean patent Application No. 2000-61697, filed on Oct. 19, 2000.

BACKGROUND OF THE INVENTION

1. Field of the Invention

The present invention relates to a vehicle hood hinge, and more particularly to a vehicle hood hinge which suppresses injury of a walker by retracting a hood at the rear when the hood contacts with a body of the walker as a head-on collision accident occurs between a vehicle and the walker during driving of the vehicle.

2. Prior Art

Recently, according to walker safety regulations which will be in force in vehicle export countries as well as Korea, attempts have progressed to minimize an impact value which occurs when a walker collides with a vehicle, deforming a body of the vehicle, such as a hood.

According to the walker safety regulations, an impact value is detected by launching a head form, taken from a head of the walker, at a speed of 40 kph. This impact value is used as a standard determination of impact energy. A collision position of a head of a walker is virtually set at an end portion at a front glass of a hood, i.e., near a hinge.

Generally, an engine room 90 is formed at the front of a vehicle, as shown in FIG. 1. Engine and various parts are received in the engine room 90. A hood 60 is rotatably mounted around a hinge 100 in an upper portion of the engine room 90 to protect the engine room 90.

As shown in FIG. 2, a related art vehicle hood hinge includes a hinge support 20, a hinge arm 10, and a hinge pin 30. A link piece 22d having a hinge hole 23 is formed at the rear of the hinge support 20 to extend upwardly in an integral form with the hinge support 20, and a securing hole 21 is formed at the front of the hinge support 20 to pass through the hinge support 20. An insertion hole 12 is formed at the rear of the hinge arm 10, and a fitting hole 11 is formed at the front of the hinge arm 10 to pass through the hinge arm 10. The insertion hole 12 has an inner diameter equal to that of the hinge hole 23 of the link piece 22d. The link piece 22d is formed in the hinge support 20. The hinge pin 30 is fitted into the insertion hole 12 of the hinge arm 10 and the hinge hole 23.

In the aforementioned related art vehicle hood hinge, when the center of the insertion hole 12 of the hinge arm 10 is parallel to the center of the hinge hole 23 pierced in the link piece 22d of the hinge support 20, the hinge pin 30 is inserted into the insertion hole 12 and the hinge hole 23. Thus, the hinge support 20 and the hinge arm 10 are fitted to each other by the hinge pin 30 in such a manner that a top surface of a vehicle body and a bottom surface of the hood 60 are respectively in contact with a bottom surface of the hinge support 20 and a top surface of the hinge arm 10 by fitting a bolt 70 through the securing hole 21 and the fitting hole 11. Thus, the hood 60 is rotatably opened and closed around the hinge pin 30.

However, the related art vehicle hood hinge has a problem. In the related art vehicle hood hinge, the hinge arm 10, of which the top surface is in contact with the bottom surface of the hood 60 by fitting the bolt 70, is fitted into the hinge support 20, of which the bottom surface is in contact with the top surface of the vehicle body by fitting the bolt 70, by the hinge pin 30. For this reason, when the hood is in contact with a body of the walker as a head-on collision accident occurs between the vehicle and the walker during driving of the vehicle, the walker may be injured highly by an impact energy that occurs when the walker collides with the vehicle.

To solve this problem, as shown in FIG. 3, a bead portion 22a' is formed in the link piece of the hinge support 20 and connected to the hinge arm 10 by the hinge pin 30 by forming the hinge hole 23, having an inner diameter equal to that of the insertion hole of hinge arm 10.

In this bead portion 22a', when a head-on collision accident occurs between the vehicle and the walker during driving of the vehicle, the bead portion 22a' formed in the link piece of the hinge support 20 is deformed to absorb an impact energy, thereby reducing injury of the walker. However, it is impossible for the bead portion 22a' to control breakdown load. For this reason, it was difficult to suppress the injury of the walker. A problem also arises in that the hinge portion is not deformed. Because of this problem, the impact energy at the head portion of the walker increases, thereby failing to pass collision test standards of the walker.

SUMMARY OF THE INVENTION

Accordingly, the present invention is directed to a vehicle hood hinge that substantially obviates one or more of the problems due to limitations and disadvantages of the related art.

An object of the present invention is to provide a vehicle hood hinge, wherein a hood moves downwardly to absorb impact energy as a bottom end of a first link moves along a slot, thereby reducing injury of a walker when the hood is in contact with a body of the walker due to a head-on collision accident between a vehicle and the walker during driving of the vehicle.

Another object of the present invention is to provide a vehicle hood hinge in which an impact value of a walker during a head-on collision accident is minimized, so as to more safely protect the walker.

Another object of the present invention is to provide a vehicle hood hinge that fulfills walker safety regulations which will be in force in domestic and foreign countries.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a vehicle hood hinge according to the present invention includes a hinge arm 10 contacted with a bottom surface of hood 60 at its top surface and provided with a fitting hole 11 and first and second hinge holes 13 and 14, the fitting hole 11 being fitted into the bottom surface of the hood 60 by a bolt 70, and the first and second hinge holes 13 and 14 being formed at front and rear portions of one side of the hinge arm 10; first and second links 40 and 50 being respectively fitted into the first and second hinge holes 13 and 14 by a shaft pin 32 at their top portions; a hinge support 20 provided with a hinge hole 23 at one side portion and securing holes 21 at front and rear portions, the hinge hole 23 being rotatably fitted to a bottom portion of the second link 50 by the shaft pin 32, and the securing holes 21 being fitted into a top surface of the vehicle at its bottom surface by a bolt 70; a slot 22 longitudinally pierced in a lengthwise direction to detach the hinge pin 30 fitted into the bottom portion of the first link 40 from a center shaft of the hinge during an external impact; and a hinge positioning means 22a formed in the slot 22 to prevent the hinge pin 30 from being detached from a normal hinge operation position.

Accordingly, when the hood 60 opens and closes normally, a hinge shaft is formed in a normal position of the hinge pin 30 by the hinge positioning means 22a. When an external impact is applied to the top surface of the hood 60 to act on a head portion of a walker due to a collision accident, the hinge pin 30 is detached from the slot 22 to reduce impact energy.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
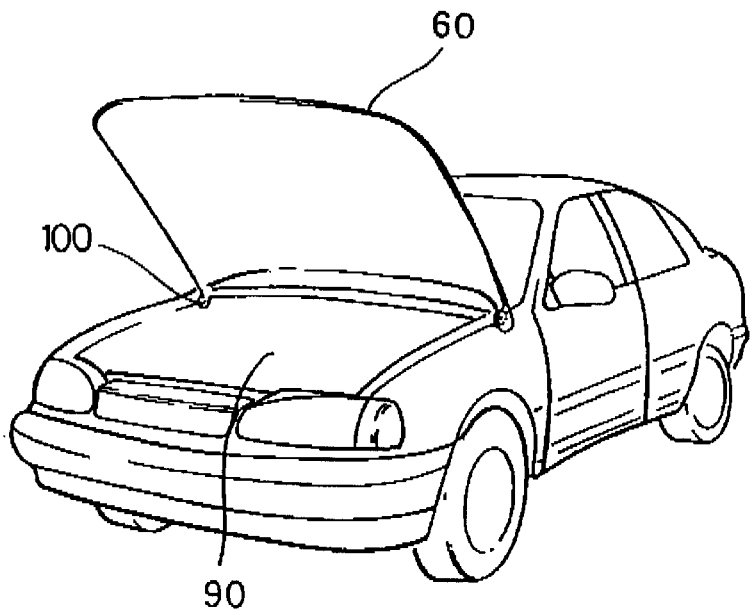
FIG. 1 is a perspective view showing a state in which a hood is mounted in a general vehicle.
Figure 2:
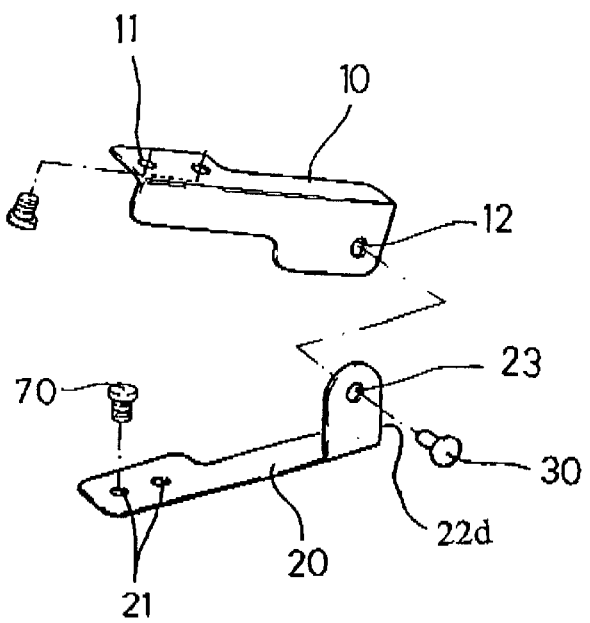
FIG. 2 is an exploded perspective view showing a state in which a related art hood hinge is fitted.
Figure 3:
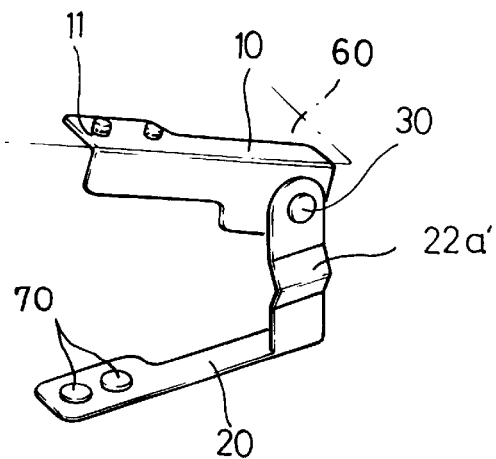
FIG. 3 is a perspective view showing an embodiment of a related art hood.
Figure 4:
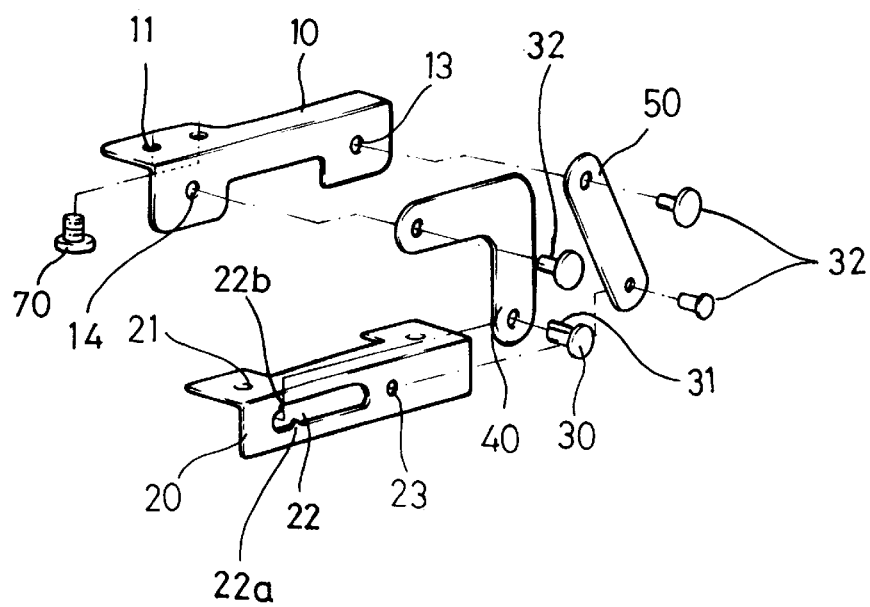
FIG. 4 is an exploded perspective view showing a state in which a hood hinge of the present invention is fitted.
Figure 5:
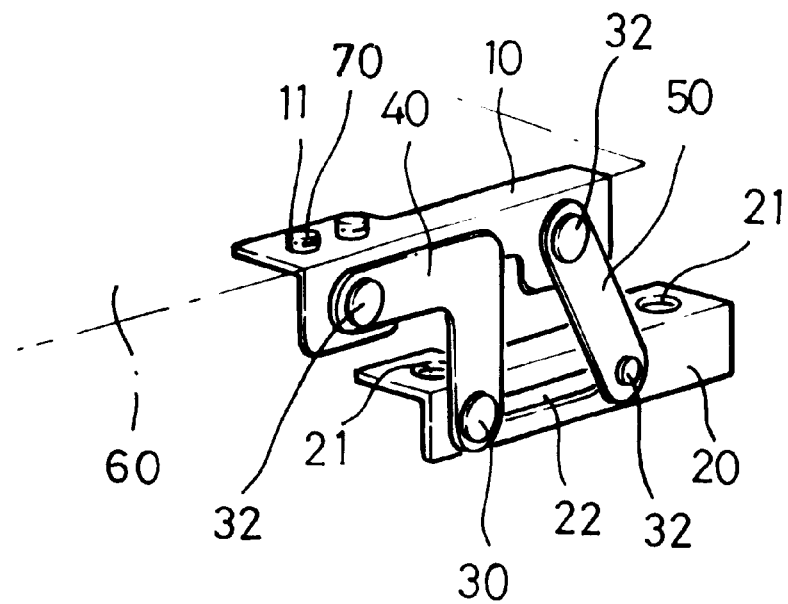
FIG. 5 is a perspective view showing a state in which a hood hinge of the present invention is fitted.

FIGS. 4 to 7 show structures of a hood hinge according to one embodiment of the present invention. FIG. 4 is an exploded perspective view showing a state in which a hood hinge of the present invention is fitted.

Figure 6:
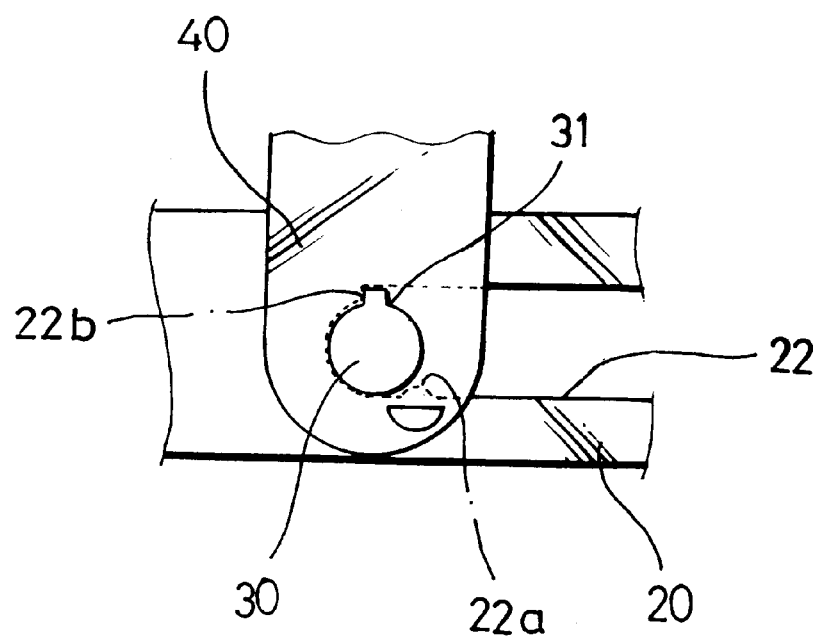
FIG. 6 is an enlarged view showing a main element of the present invention.
Figure 7:
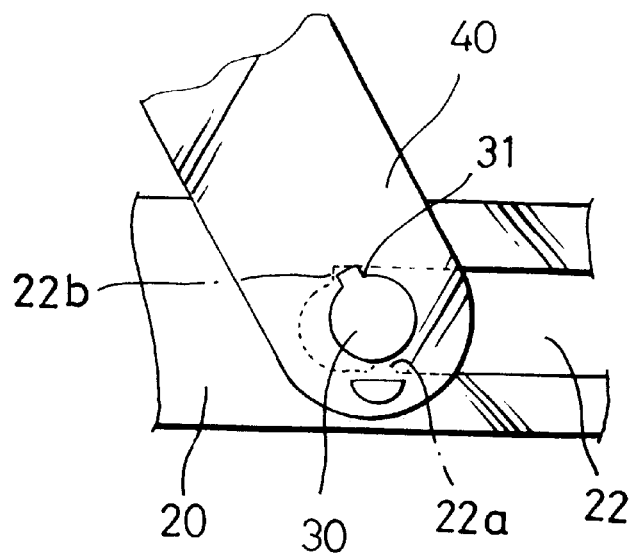
FIG. 7 is an enlarged view showing a state in which a pin is detached from a protrusion of a slot in the present invention.

FIG. 6 is a partially enlarged view of a state in which a hinge pin 30 is prevented from being detached from the center of a hinge in a normal operation state by a hinge positioning means 22a. FIG. 7 is an enlarged view of a state in which the hinge pin 30 is detached toward a slot 22 formed longitudinally in a horizontal length direction when impact is applied to a top portion of a hood 60 due to collision between a vehicle and a walker.

Figure 8:
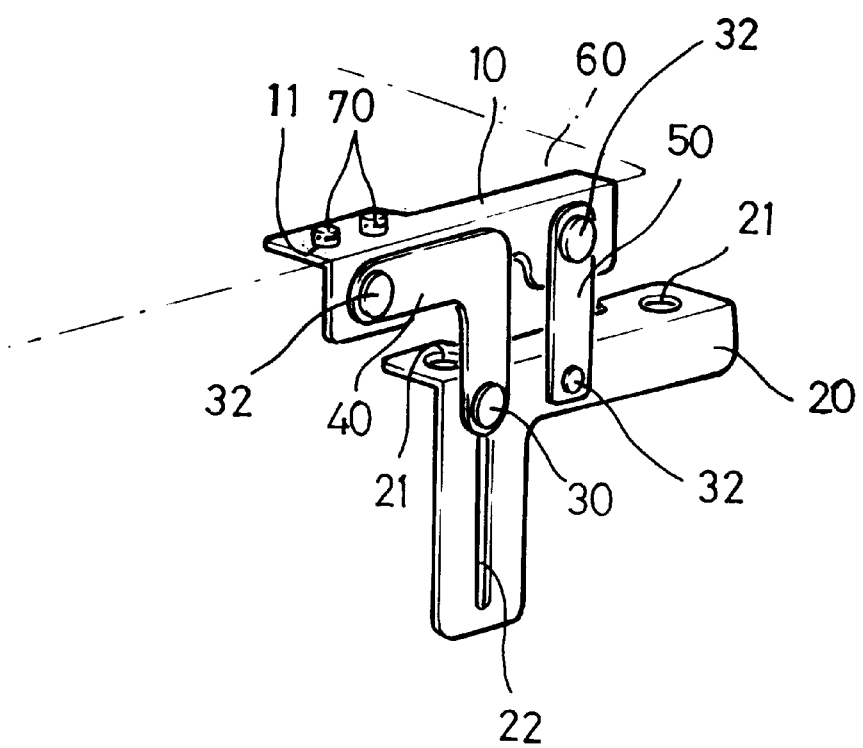
FIG. 8 is a perspective view showing an embodiment of a vehicle hood hinge according to the present invention.
Figure 9:
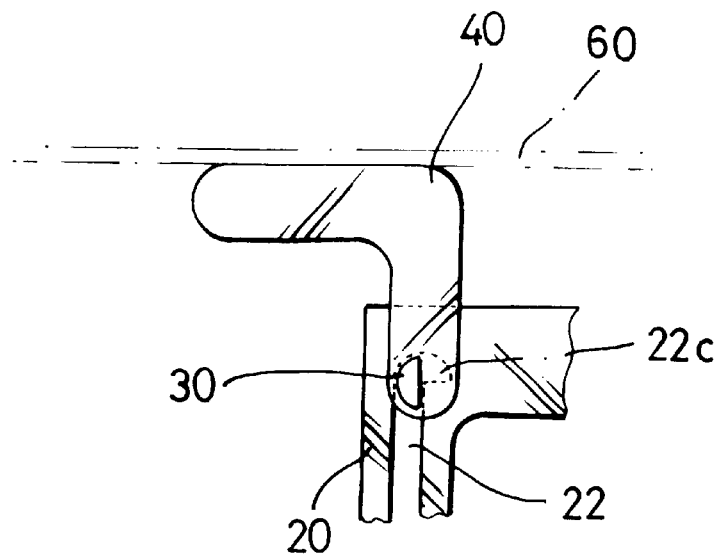
FIG. 9 is an enlarged view showing a main element of the embodiment according to the present invention.
Figure 10:
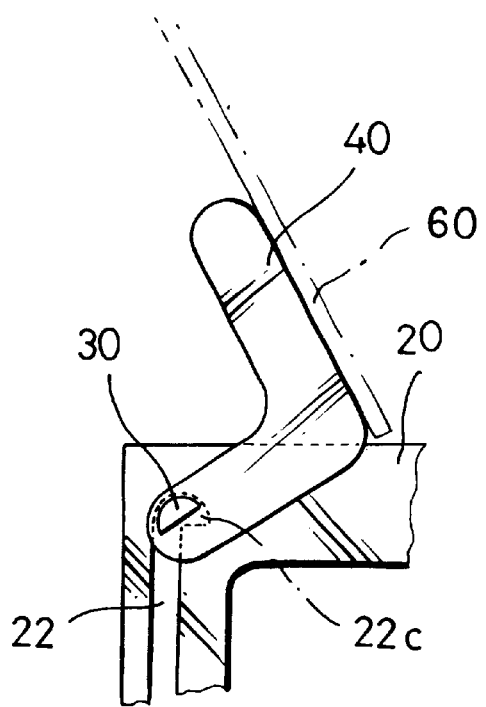
FIG. 10 is an enlarged view showing a state in which a vehicle hood hinge according to the embodiment of the present invention is operated.

FIGS. 8 to 10 show another embodiment of the present invention. FIG. 8 is a partially enlarged perspective view of a fitting state, in which the hinge pin 30 is prevented from detached from the center of the hinge in a normal operation state by the hinge positioning means 22a. FIG. 9 is an enlarged view of a state in which the hinge pin 30 is detached toward the slot 22 formed longitudinally in a vertical length direction when impact is applied to the top portion of the hood 60 due to collision between the vehicle and the walker.

A hinge arm 10 is in contact with a bottom surface of the hood 60 at its top surface and is provided with a fitting hole 11 fitted by a bolt 70 to act as a variable bracket.

A hinge support 20 is fitted into a vehicle body by the bolt 70. A first link 40 and a second link 50 are hinge-coupled at a constant distance between the hinge support 20 and the hinge arm 10.

A first hinge hole 13 and a second hinge hole 14 are pierced in the hinge arm 10 which connects with top portions of the first and second links 40 and 50, so that the first and second hinge holes 13 and 14 are hinge-coupled by a shaft pin 32. The shaft pin 32 is assembled in a bottom portion of the second link 50 through the hinge hole 23. The hinge pin 30 is assembled in a bottom portion of the first link 40 through the slot 22 pierced in the hinge support 20.

Securing holes 21 are respectively pierced in front and rear portions of the hinge support 20 so that the hinge support 20 is fitted into the top surface of the vehicle body by the bolt 70.

The slot 22 is longitudinally pierced in a lengthwise direction to detach the hinge pin 30 fitted to the bottom portion of the first link 40 from the center shaft of the hinge during an external impact. The hinge positioning means 22a is provided in the slot 22 to prevent the hinge pin 30 from being detached in a normal hinge operation position.

FIGS. 4 to 7 show an embodiment in which the slot 22 is formed in a horizontal direction to detach and deform the hinge pin 30 in a horizontal direction when impact is applied to the hood 60. FIG. 8 to 10 show another embodiment in which the slot 22 is formed on a vertical direction to detach and deform the hinge pin 30 and the hood 60 in a vertical direction.

In the embodiment of FIGS. 4 to 7, one example of the hinge positioning means 22a is shown to allow the hinge pin 30 to normally perform its hinge function.

In other words, the hinge pin 30 is formed in a shape in which a key 31 is integrally attached to a cylindrical support, and a hanging portion 22b is formed in the slot 22 to hang the key 31 therein. The hinge positioning means 22a is prominently molded at a constant height to rotate the cylindrical support.

FIG. 6 shows a position of a normal operation state in which the hinge pin 30 opens the hood 60. Referring to FIG. 6, the key 31 is rotated within the range between the hanging portion 22b and the protrusion 22a so as not to cause any problem in opening and closing the hood 60.

FIG. 7 shows a state in which an external impact is applied to a top portion of the hood 60 due to a collision between the top portion of the hood and a head of the walker. Referring to FIG. 7, when the impact energy is applied to the first link 40, the hinge pin 30 is detached from the protrusion 22a projected to support the cylindrical support of the hinge pin 30.

Accordingly, the first link 40 is retracted at the rear and deformed in a state that it is connected to the hood 60. Thus, it is possible to reduce impact energy of the walker, applied to the top portion of the hood 60.

In the embodiment of FIGS. 8 to 10, the hinge pin 30 is molded in a half moon shape. The half moon shaped hinge pin 30 hinges at a bending support 22c formed in a top portion of the vertical slot 22.

FIG. 9 shows a state in which the hood 60 covers an engine room 90 of the vehicle. Referring to FIG. 9, the half moon shaped hinge pin 30 is located in the top portion of the slot 22. In this state, when a head-on collision accident occurs between the vehicle and the walker during driving of the vehicle, the head of the walker comes into collision with the top portion of the hood 60 and the external impact is applied to the top portion of the hood 60. At this time, the hinge pin 30 fitted into the end portion of the first link 40 descends along the slot 22 longitudinally formed in a vertical direction. For this reason, the hinge pin 30 is detached from the top portion.

Accordingly, the first link 40 is retracted at the rear and deformed in a state that it is connected with the hood 60, so that impact energy of the walker, which is applied to the top portion of the hood 60, can be reduced.

Meanwhile, when the hood 60 opens normally as shown in FIG. 10, the bending support 22c is molded in a half moon shape at the top portion of the slot 22, to be pierced through the slot 22. Thus, a problem does not occur in normally rotating the hinge pin 30 in the top position, thereby opening the hood 60 normally.

As aforementioned, the vehicle hood hinge of the present invention has the following advantages.

When the hood is in contact with a body of the walker as a head-on collision accident occurs between the vehicle and the walker during driving of the vehicle, the hood is deformed by retracting the bottom end portion of the first link along with the hinge pin, thereby absorbing the impact energy. Accordingly, it is possible to suppress injury of the walker. Furthermore, an impact value at the head of the walker during a head-on collision accident is minimized, so as to protect the walker more safely, thereby improving safety and reliability of the product. Finally, it is possible to fulfill walker safety regulations which will be in force in domestic and foreign countries.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A vehicle hood hinge comprising:
   a hinge arm contacted with a bottom surface of a vehicle hood at its top surface and provided with a fitting hole and first and second hinge holes, the fitting hole being fitted into the bottom surface of the hood by a bolt, and the first and second hinge holes being formed at front and rear portions of one side of the hinge arm;
   first and second links being each respectively connected to the first and second hinge holes by a shaft pin at their top portions;
   a hinge support provided with a hinge hole at one side portion and securing holes at front and rear portions, the hinge hole being rotatably fitted to a bottom portion of the second link by a shaft pin, and the securing holes being connected to a top surface of the vehicle at its bottom surface by a bolt;
   a slot longitudinally piercing the hinge support in a lengthwise direction for receiving a hinge pin, which connects a bottom portion of the first link to the hinge support, the hinge pin being detachable from a normal hinge position during an external impact to the hood; and
   hinge positioning means formed in the slot to prevent the hinge pin from being detached from the normal hinge position during a normal hinge operation.

2. The vehicle hood hinge of claim 1, wherein the hinge pin is provided with a key and a cylindrical support, a hanging portion is formed in the slot to hang the key therein, and the hinge positioning means is a protrusion prominently formed at a bottom portion of the slot to support rotation of the cylindrical support of the hinge pin.

3. The vehicle hood hinge of claim 2, wherein the key of the hinge pin is integrally formed on the cylindrical support in a key shape.

4. A vehicle hood hinge comprising:
   a hinge arm contacted with a bottom surface of a vehicle hood at its top surface and provided with a fitting hole and first and second hinge holes, the fitting hole being fitted into the bottom surface of the hood by a bolt, and the first and second hinge holes being formed at front and rear portions of one side of the hinge arm;
   first and second links being each respectively connected to the first and second hinge holes by a shaft pin at their top portions;
   a hinge support provided with a hinge hole at one side portion and securing holes at front and rear portions, the hinge hole being rotatably fitted to a bottom portion of the second link by a shaft pin, and the securing holes being connected to a top surface of the vehicle at its bottom surface by a bolt;
   a slot vertically piercing the hinge support, the slot for receiving a hinge pin, which connects a bottom portion of the first link to the hinge support, the hinge pin being detachable from a normal hinge position during an external impact to the hood; and
   hinge positioning means formed in the slot to prevent the hinge pin from being detached from the normal hinge position during a normal hinge operation, wherein the hinge pin forms a half moon shape, and the half moon shaped hinged pin hinges in a bending support formed in a top portion of the vertical slot.

5. A vehicle hood hinge comprising:
   a hinge arm for attachment to a vehicle hood, the hinge arm including a hinge arm flange with first and second hinge holes;
   first and second links, the first and second links having respective upper and lower hinge holes, wherein the upper hinge hole of the first link is connected to the first hinge hole of the hinge arm via a first hinge pin and the upper hinge hole of the second link is connected to the second hinge hole of the hinge arm via a second hinge pin;
   a hinge support for attachment to a vehicle body, the hinge support including a hinge support flange;
   the hinge support flange including a slot formed substantially parallel to a longitudinal axis of the flange and a hinge hole of the hinge support flange, wherein the lower hinge hole of the first link is attached to the slot via a third hinge pin and the lower hinge hole of the second link is attached to the hinge hole of the hinge support flange via a fourth hinge pin;
   hinge positioning means formed in the slot, wherein the hinge positioning means retains the third hinge pin in a fixed position during normal hinge operation, and further wherein the hinge positioning means allows the third hinge pin to detach from its normally fixed position and travel down the slot during an external impact upon the hood.

\* \* \* \* \*